United States Patent [19]

Baumgartner et al.

[11] Patent Number: 5,121,501
[45] Date of Patent: Jun. 9, 1992

[54] FIRST PROCESSOR INSERTING HOOKS INTO SOFTWARE AND SENDING UNIQUE IDENTIFICATIONS TO OUTPUT BUS AND SECOND PROCESSOR ASSOCIATING DATA FRAMES AND TIME WITH THESE UNIQUE IDENTIFICATIONS

[75] Inventors: Raymond S. Baumgartner; David A. Bishop; John R. Dyar; James D. Henson, Jr.; Kenneth M. Herrington; Charles L. Raby; Michael H. Skelton, all of Austin, Tex.

[73] Assignee: International Business Machines Corporation, Armonk, N.Y.

[21] Appl. No.: 458,045

[22] Filed: Dec. 27, 1989

[51] Int. Cl.⁵ ............................................. G06F 11/34
[52] U.S. Cl. ............................. 395/800; 364/DIG. 1; 364/267; 364/267.2; 364/274.1; 364/275.5; 364/240; 371/19
[58] Field of Search ... 364/200 MS File, 900 MS File; 371/19

[56] References Cited

U.S. PATENT DOCUMENTS

| | | | |
|---|---|---|---|
| 4,435,759 | 3/1984 | Baum et al. | 364/200 |
| 4,442,491 | 4/1984 | Olhausen, Jr. | 364/454 |
| 4,445,192 | 4/1984 | Haag et al. | 364/900 |
| 4,574,351 | 3/1986 | Dang et al. | 364/200 |
| 4,636,940 | 1/1987 | Goodwin, Jr. | 364/200 |
| 4,651,298 | 3/1987 | Currier, Jr. | 364/900 |
| 4,660,145 | 4/1987 | Hansen | 364/424.06 |
| 4,797,881 | 1/1989 | Ben-Artzi | 370/88 |
| 4,807,282 | 2/1989 | Kazan et al. | 379/284 |
| 4,821,178 | 4/1989 | Levin et al. | 364/200 |
| 4,827,411 | 5/1989 | Arrowood et al. | 364/200 |
| 4,937,740 | 6/1990 | Agarwal et al. | 364/200 |
| 5,051,944 | 9/1991 | Fetterolf et al. | 364/900 |

Primary Examiner—Thomas C. Lee
Assistant Examiner—Mehmet Geckil
Attorney, Agent, or Firm—Andrew J. Dillon

[57] ABSTRACT

A method and apparatus are disclosed for monitoring software applications within a first processor during development thereof. A limited number of uniquely identifiable elements or "hooks" are inserted into the software application under development and each time an element is encountered during processing of that software application, the identity of the element and a selected data frame are coupled to the output bus of the first processor. A data output card is utilized to couple that information to a data collection card via a dedicated cable. The data collection card is then utilized to transfer the identity of each element encountered and its associated data frame along with a time value, to a second processor, which is utilized to record that data. In one embodiment of the present invention, a switched bank memory system is utilized in the second processor to permit high speed data storage. In the event the software application under development generates monitoring outputs at a speed greater than may be accurately stored within the second processor, an overrun indication is stored within the second processor and subsequent tests may be run utilizing fewer "hooks" within the software application under development.

10 Claims, 4 Drawing Sheets 5,121,501

FIRST PROCESSOR INSERTING HOOKS INTO SOFTWARE AND SENDING UNIQUE IDENTIFICATIONS TO OUTPUT BUS AND SECOND PROCESSOR ASSOCIATING DATA FRAMES AND TIME WITH THESE UNIQUE IDENTIFICATIONS

BACKGROUND OF THE INVENTION

1. Technical Field

The present invention relates in general to the field of software monitoring and development and in particular to methods and systems for software monitoring and development which permit the detail tracing of software flow. Still more particularly, the present invention relates to methods and systems for software monitoring and development which permit the continuous recording of high-volume performance trace data for an extended time span.

2. Description of the Related Art

The monitoring and development of software applications has always represented a difficult technical challenge. Known software based "tracing" techniques typically require significant overhead in terms of processor requirements and output bus space. As a result, the performance of the software application under development cannot truly be monitored in an operating environment without severely degrading the performance thereof due to the processing requirements of the software based tracing program.

It is also especially difficult to monitor the development of software applications for a second generation processor while utilizing a first generation processor as the monitoring device. A known problem with existing hardware based software monitoring and development techniques is the inability of existing hardware monitoring systems to continuously record high-volume performance trace data for longer than a few seconds. Thereafter, the storage buffers in such devices are filled, and the monitoring system must overwrite, wrap around or stop recording.

Therefore, it should be apparent that a need exists for a software application monitoring and development system which permits the continuous recording of high-volume performance trace data without adversely affecting the performance of the software application under development.

SUMMARY OF THE INVENTION

It is therefore one object of the present invention to provide an improved method and apparatus for software monitoring and development.

It is another object of the present invention to provide an improved method and apparatus for software monitoring and development which permits the detailed tracing of software flow.

It is yet another object of the present invention to provide an improved method and apparatus for software monitoring and development which permits the detailed tracing of software flow with continuous recording of high-volume performance trace data for an extended time span.

The foregoing objects are achieved as is now described. The method and apparatus of the present invention utilize a limited number of uniquely identifiable elements or "hooks" which are inserted into the software application under development. Each time such an element is encountered during processing of the application the identity of the element and a selected data frame are coupled to the output bus of the processor running the application under development. A data output card coupled to the output bus is utilized to couple that information to a data collection card via a dedicated cable. The collection card is utilized to generate a "header" or identifying data byte and to transfer the identity of each element encountered and its associated data frame along with a time value, to a second processor, which is utilized to record that data. In one embodiment of the present invention, a switched bank memory system is utilized in the collection card to permit high speed data storage. In the event the software application under development generates monitoring outputs at a speed greater than may be accurately accepted within the collection card, an overrun indication is stored and subsequent tests may be run utilizing fewer "hooks" within the application under development.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
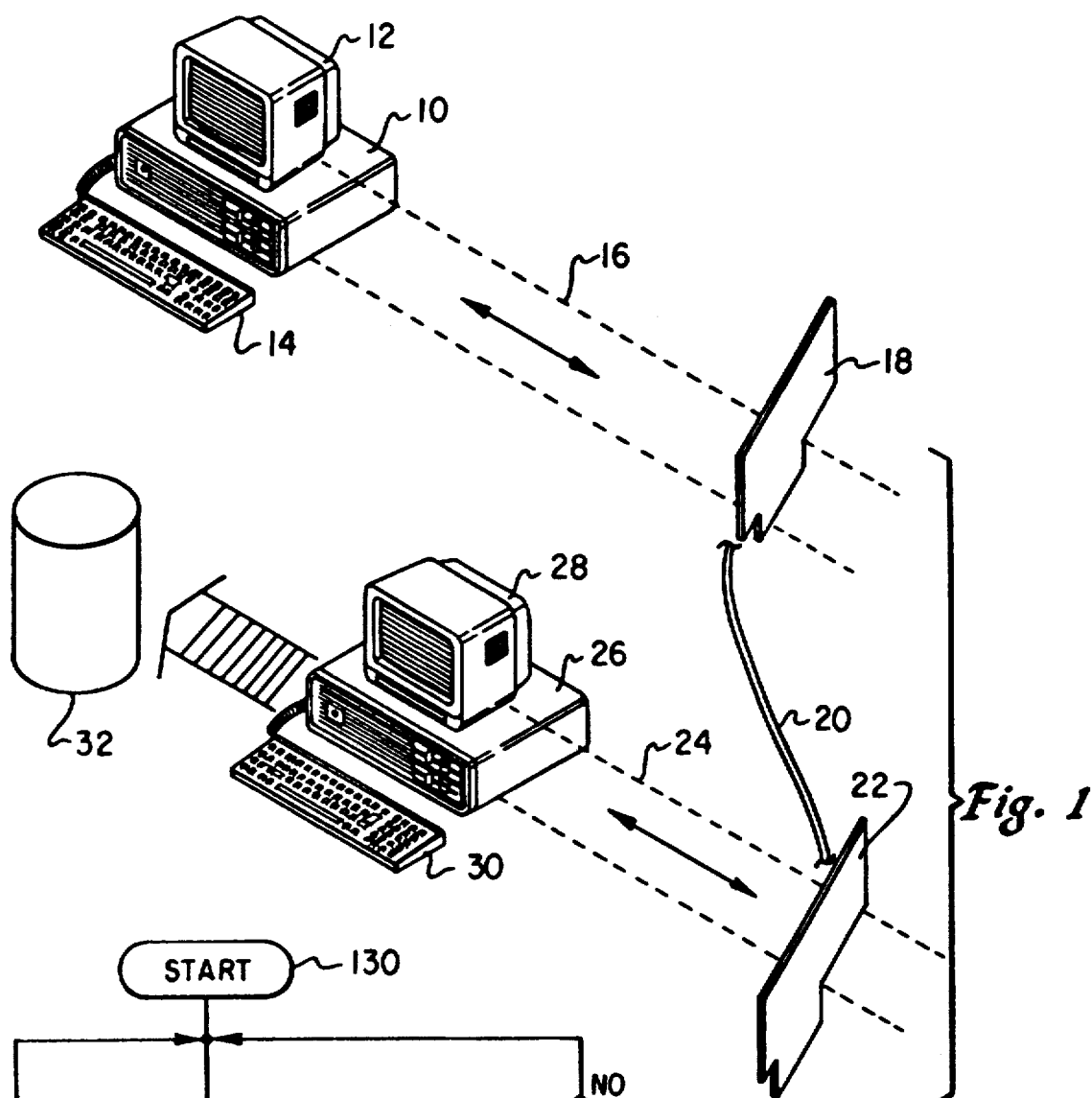
FIG. 1 is a pictorial representation of a system which may be utilized to implement the method of the present invention.

With reference now to the figures and in particular with reference to FIG. 1, there is depicted a pictorial representation of a system which may be utilized to implement the method of the present invention. As is illustrated, the system includes a first processor 10 which is utilized to operate the software application under development. Typically, in the case of new software applications, the major portion of development of new applications is accomplished for a new generation of processors. For example, first processor 10 may comprise a new personal computer such as the PS/2 Personal Computer manufactured by International Business Machines Corporation of Armonk, N.Y. Associated with first processor 10, in a manner well known in the prior art, are display 12 and keyboard 14. Schematically indicated in association with first processor 10 is output bus 16. Those skilled in the art will appreciate that output bus 16, in the case of a PS/2 Personal Computer will comprise a sixteen bit data bus.

In accordance with an important aspect of the present invention, a data output card 18 is coupled to output bus 16 by means of an expansion slot or other connection means generally provided in the personal computer art.

Data output card 18 is utilized, in conjunction with the method of the present invention, to couple selected information regarding the monitoring of the software application under development within first processor 10 to data collection card 22 via dedicated cable 20.

Data collection card 22 is then utilized, in accordance with an important feature of the present invention, to associate a header or identifying frame of data with each frame of information concerning the monitoring of the software application under development, as well as a time tag to permit the chronological analysis of the software application under development.

Each frame of data which is utilized to monitor the software application under development within first processor 10 is then coupled, via input/output bus 24 to second processor 26. Second processor 26 is preferably a personal computer and is typically a computer less advanced than the second generation machines for which new software applications are generally developed. For example, in the event a software application is being developed for first processor 10, wherein first processor 10 comprises a PS/2 Personal Computer, second processor 26 will typically be implemented utilizing a personal computer such as the PC-AT computer manufactured by International Business Machines Corporation. Second processor 26 will also generally include a display 28 and a keyboard 30 in a manner well known in the prior art. Also associated with second processor 26 is disk storage 32 which may be utilized, in accordance with one aspect of the present invention, to store multiple frames of data relating to the development of the software application within first processor 10.

Figure 2:
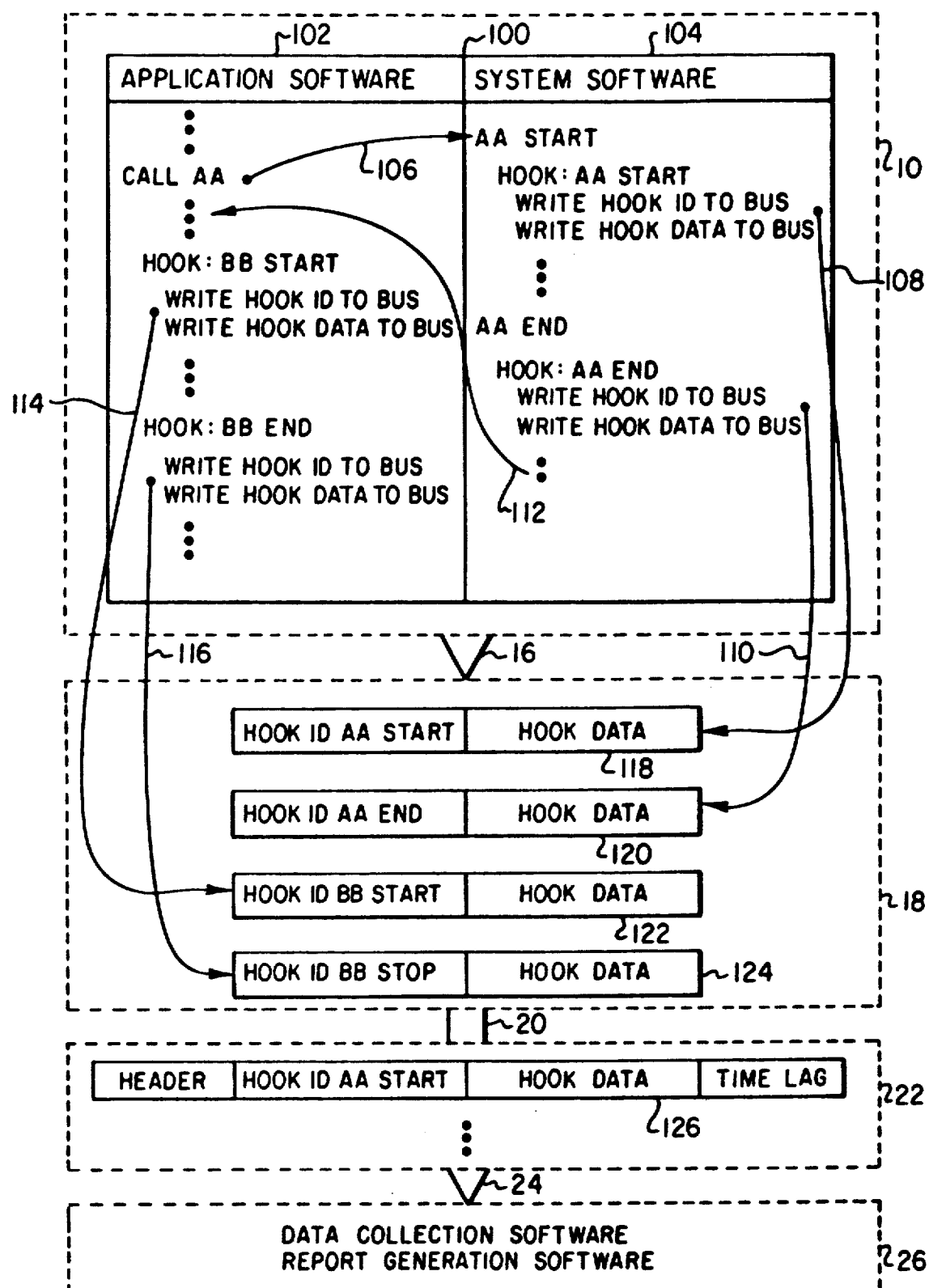
FIG. 2 is a schematic pictorial representation of the method of the present invention.

Referring now to FIG. 2, there is depicted a schematic pictorial representation of the method of the present invention. Those skilled in the art will appreciate that certain elements within FIG. 2, although depicted schematically, are labelled with reference numerals which correspond to the pictorial representations of those elements within FIG. 1, for the sake of clarity. As can be seen, FIG. 2 includes a pictorial representation of development software 100 which is resident within first processor 10. In the depicted embodiment of the present invention, development software 100 includes both application software 102 and system software 104. As is illustrated, upon the execution of application software 102, the processing of the software will eventually encounter the step "CALL AA." Thereafter, as indicated by arrow 106, this reference to a portion of the system software will cause the program module AA to begin. At this point, in accordance with the method of the present invention, a uniquely identifiable element or "hook" is positioned within the software. This particular hook is referred to as "AA START." Thereafter, the method of the present invention will cause the identification of that hook to be written to the output bus, along with a frame of data which has been preselected to be output in conjunction with this particular hook. This data is then written via output bus 16 into data output card 18, as illustrated at arrow 108.

The software application contained within the module AA then continues until the end of this module is encountered. Thereafter, in accordance with the illustrated embodiment of the present invention, a second hook "AA END" is encountered. This encountering of another hook will cause the hook identification and data associated therewith to be written to output bus 16 and into data output card 18, as depicted at arrow 110. Thereafter, as indicated by arrow 112, software module AA ends and returns to application software 102.

The continued processing of application software 102 will, in accordance with the depicted example, eventually encounter a third hook "BB START." Thereafter, as in the above example, the encountering of this hook will automatically cause an identification of the hook and an appropriate data frame to be written to output bus 16 and into data output card 18, as illustrated at arrow 114. Finally, the hook "BB END," associated with the termination of this section of application software 102, will be encountered and will similarly be written to output bus 16 and into data output card 18, as indicated at arrow 116.

Still referring to FIG. 2, the contents of data output card 18 are indicated in a schematic pictorial representation. As is illustrated, ID/data frames 118, 120, 122, and 124 are depicted within data output card 18. Those skilled in the art will appreciate that these ID/data frames are preferably coupled from output bus 16 through data output card 18 to data collection card 22 via dedicated cable 20. Thus, it should be apparent that by utilizing the method of the present invention, it is possible to generate multiple frames of data, each frame including an identification of the hook element within the software application under development and a predetermined frame of data identifying specific details of the performance of the software application at that point.

Thereafter, each of these data frames is coupled to data collection card 22, wherein a tagged data frame 126 is created for each data frame output from data output card 18. As is illustrated, tagged data frame 126 preferably includes a header or command byte which identifies the particular frame in question. Next, as discussed with regard to ID/data frames 118, 120, 122, and 124, tagged data frame 126 includes an identification of the particular hook in question and a frame of data associated therewith. Finally, in accordance with an important aspect of the present invention, each tagged data frame 126 preferably includes a time tag which may be utilized to ascertain the chronological order in which the processes within the application program under development have been encountered.

Finally, input/output bus 24 is utilized to couple a plurality of tagged data frames from data collection card 22 to second processor 26. At this point, those skilled in the art will appreciate that various data collection and report generation software packages may be utilized to assemble and publish reports which may be generated from the many tagged data frames which have been stored, thereby permitting the accurate monitoring of the software application under development.

Figure 3:
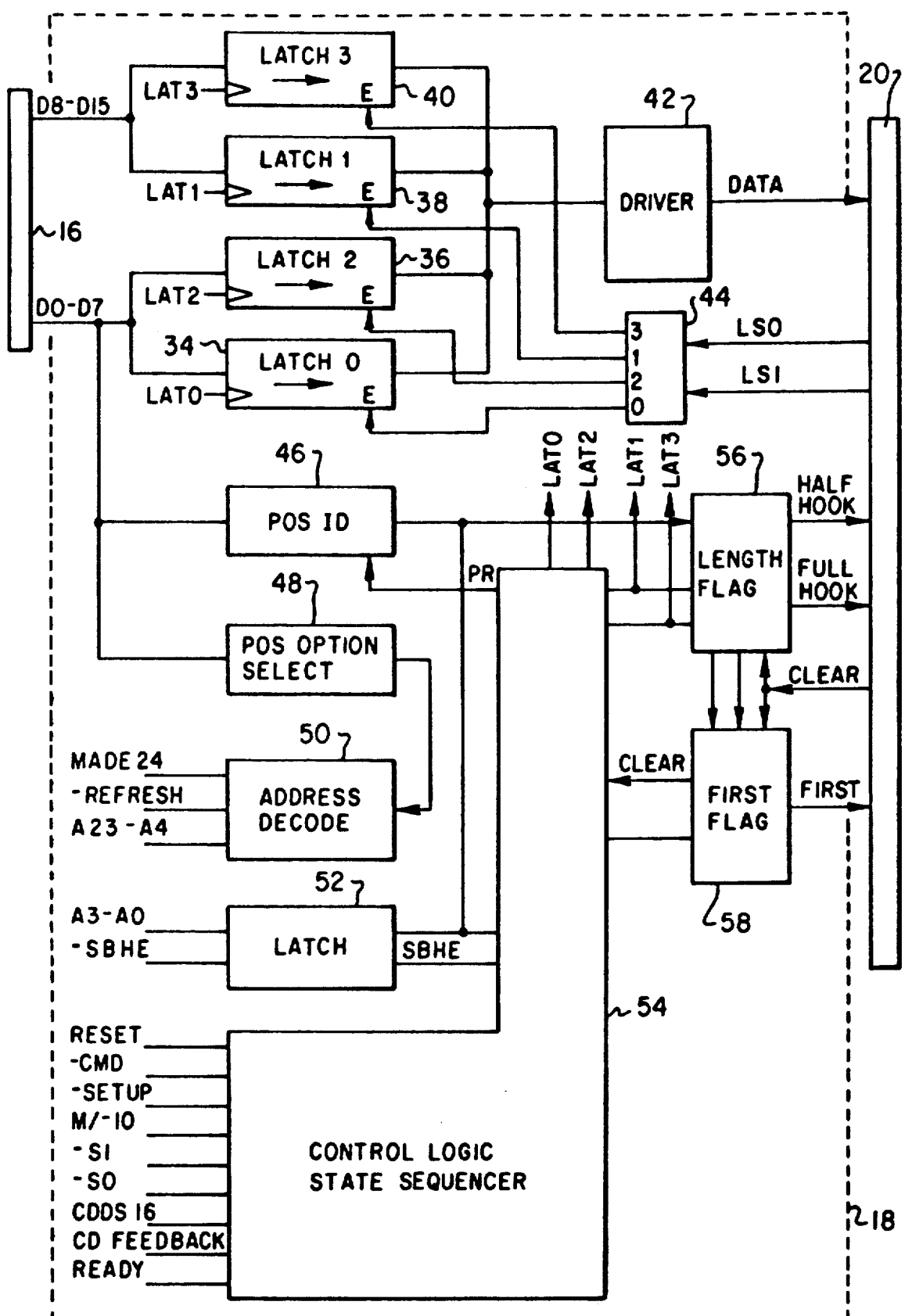
FIG. 3 is a generalized block diagram of a data output card which may be utilized with the method of the present invention.

Referring now to FIG. 3, there is depicted a generalized block diagram of data output card 18 which may be utilized with the method of the present invention. Those skilled in the art will appreciate that many different electronic configurations may be utilized with the method and system of the present invention; however, FIG. 3 is intended to be a general representation of the type of circuitry which may be utilized to implement the method of the present invention.

As may be seen, data output card 18 is coupled between output bus 16 and to dedicated cable 20. In the event that first processor 10 comprises a PS/2 Personal Computer, output bus 16 will include sixteen data lines which may be written to by the processor within first processor 10. As is illustrated, in the depicted embodiment of the present invention, data lines D0-D7 are coupled to latch 34 and 36 while data lines D8-D15 are coupled to latches 38 and 40. By selective enablement of these latches it is possible to temporarily store data coupled from output bus 16 and thereafter couple that data via data driver 42 to an output line which may be coupled, in a manner which will be explained in greater detail herein, to data collection card 22, via dedicated cable 20.

Also coupled to output bus 16 are Programmable Option Select ID circuit 46 and Programmable Option Select circuit 48. These circuits are utilized, in a manner well known in the art in conjunction with the PS/2 Personal Computer to automatically provide the processor with an indication of the address and identification of each peripheral circuit card or device which is coupled to output bus 16. Address decode circuit 50 is preferably utilized to decode address bytes coupled to data output card 18.

Control logic/state sequencer 54 is preferably implement utilizing a programmable array logic and is utilized to generate control signals including: LAT 0, LAT 1, LAT 2, and LAT 3 which control the operation of latches 34, 36, 38, and 40. Further, control logic/stat sequencer 54 is utilized, in the depicted embodiment of FIG. 3, to set a hook length flag, via length flag circuit 56. The hook length flag is utilized to provide an indication of whether or not the data being output from first processor 10 consists of two bytes of data or four bytes of data.

In accordance with an important feature of the present invention described above, certain uniquely identifiable elements or "hooks" are inserted within the software application and are utilized to trace the performance of that software application during development. In the depicted embodiment of the present invention, these pieces of information may comprise either two bytes or four bytes of data and this information is coupled to data collection card 22 via dedicated cable 20 from length flag circuit 56.

In a manner which will be explained with regard to FIG. 4, these signals are utilized by data collection card 22 to generate control signals LS0 and LS1 which are coupled to demultiplexer 44 to sequentially enable the outputs of latches 34, 36, 38, and 40. Finally, first flag circuit 58 is utilized to generate a signal to data collection card 22 via dedicated cable 20 to identify the first frame of data within each hook which is coupled to data collection card 22. This is preferably utilized to prevent confusion which may occur in the event of an interrupt or other discontinuity during the transmission of software application monitoring data.

Figure 4:
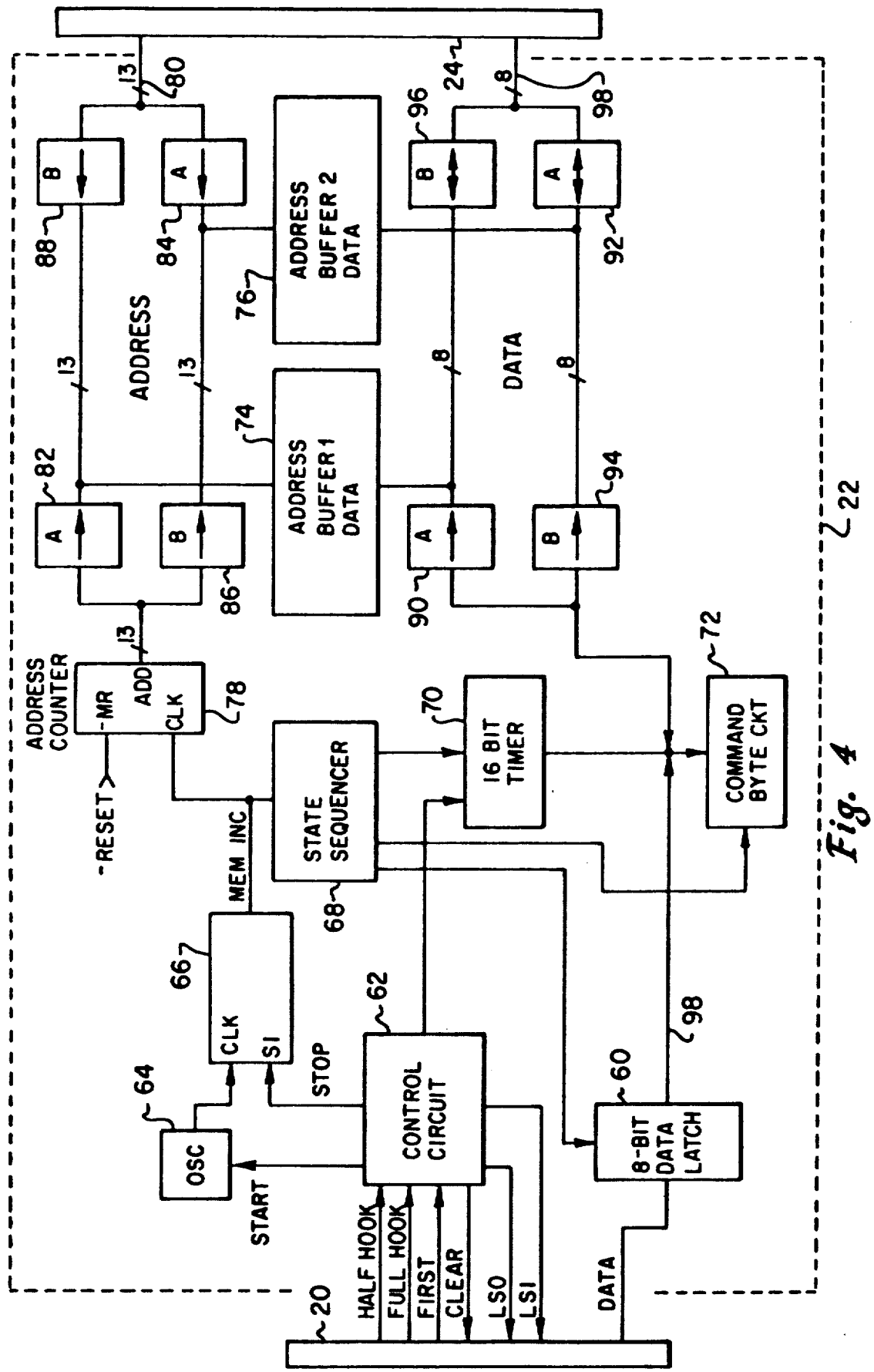
FIG. 4 is a generalized block diagram of a data collection card which may be utilized with the method of the present invention.

Referring now to FIG. 4, there is depicted a generalized block diagram of a data collection card 22, which may be utilized with the method of the present invention. As is illustrated, data from dedicated cable 20, which has been coupled from data output card 18, is coupled via eight bit data latch 60 onto data line 98. This data may be processed, in accordance with the method of the present invention, utilizing circuitry similar to that disclosed within this figure.

Control circuit 62 is preferably implemented utilizing standard TTL logic circuits and may be varied to accommodate the approach desired by anyone who seeks to implement a software application monitoring and development technique in accordance with the method of the present invention. As is illustrated, control circuit 62 is utilized to generate control signals LS0 and LSI, which operate demultiplexer 44 (see FIG. 3) in response to half hook or full hook signals generated by control logic/state sequencer 54 of the data output card.

Control circuit 62 also preferably enables the output of oscillator 64 which operates at a frequency sufficient to permit the memory devices within data collection card 22 to rapidly store data generated from data output card 18. In the depicted embodiment of the present invention an eight megahertz oscillator is utilized. The output of oscillator 64 is then coupled to clock circuit 66, which acts to synchronize the pulses output from oscillator 64 and provide a system clock signal. This clock signal is then coupled to state sequencer 68 and address counter 78 to permit the accurate sequencing of the operations within data collection card 22.

In conjunction with state sequencer 68, sixteen bit timer 70 and command byte circuit 72 may be utilized to generate a time tag and command header data frame which are thereafter coupled to data line 98 to form a tagged data frame 126 (see FIG. 2).

Next, in accordance with an important feature of the present invention, data collection card 22 preferably utilizes a switched bank memory system to permit the rapid storing of data which has been output by data output card 18. This is particularly important in view of the fact that software applications for new generation processors are often developed and monitored by older generation machines and the speed differential in the processors involved make it imperative that the data collected during this monitoring process be stored as rapidly as possible.

In accordance with the embodiment depicted within data collection card 22 of FIG. 4, the present invention utilizes two separate memories, buffer 74 and buffer 76. As with known switched bank memory techniques, the data input via data line 98 is preferably coupled via either A data driver 90 or B data driver 94 to buffer 74 or buffer 76 respectively. Simultaneously, a thirteen bit address signal from second processor 26 is coupled via input/output bus 24 into data collection card 22 via address line 80. This address information is then coupled to buffer 74 or buffer 76 by B address drier 88 or A address drier 84 respectively. Address counter 78 is utilized, in a manner well known in the art, to increment these addresses and couple the incremented address to buffer 74 or buffer 76 via A address driver 82 or B address driver 86 respectively.

As those skilled in the art will appreciated, data collection card 22 of the present invention utilizes buffer 74 and buffer 76 in a switched bank memory storage technique. That is, data is coupled, via data line 98, into buffer 74, via A data driver 90 while B data driver 94 is not enabled. While data is being entered into buffer 74, data previously entered into buffer 76 is being coupled out, via input/out bus 24, to second processor 26 by means of A data driver 92 while B data driver 96 is inoperative.

Conversely, after buffer 74 has been filled, data is coupled into buffer 76 via B data driver 94 while previously stored data is being coupled out of buffer 74 iva B data driver 96. In this manner, one buffer is always being filled while the other buffer is being emptied. This particular technique permits a current state-of-the-art processor to receive data at approximately twice normal speed, thus enabling the software monitoring and development system of the present invention to continuously record highly detailed trace information for long periods of time.

Figure 5:
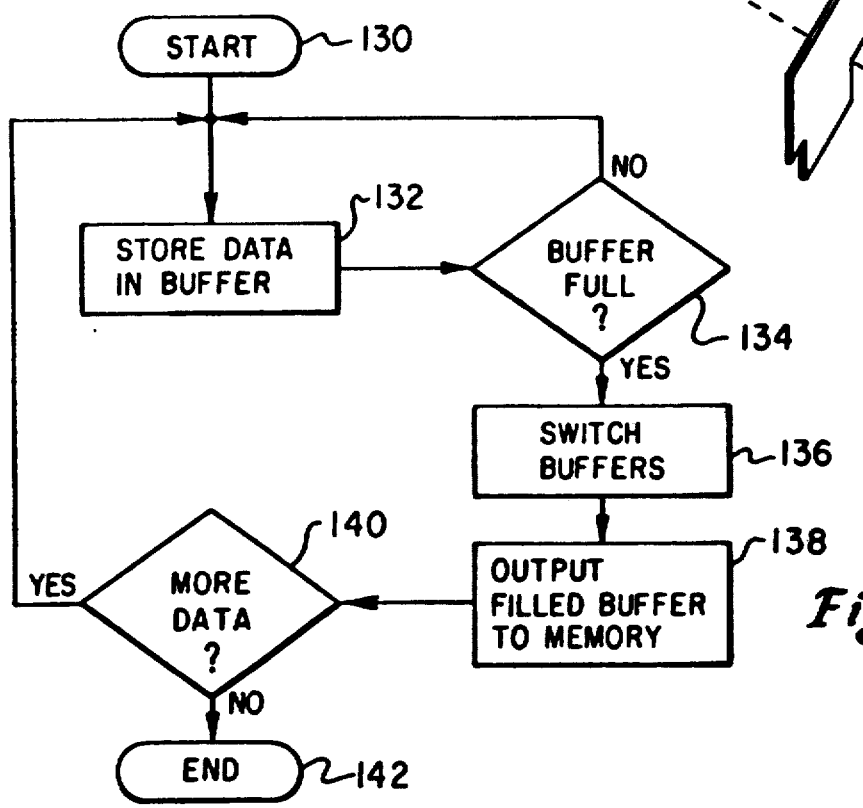
FIG. 5 is a logic flow chart illustrating the collection of monitoring data in accordance with the method of the present invention.

Finally, with reference to FIG. 5, there is depicted a logic flow chart illustrating the collection of monitoring data in accordance with the method of the present invention. As is illustrated, the process beings at block 130 and thereafter proceeds to block 132 which illustrates the storing of data into a buffer within data collection card 22 (see FIG. 4). Next, block 134 depicts a determination of whether or not the present buffer being utilized is full, and, if not, the process returns to block 132 and additional data is stored within that buffer.

In the event the buffer currently being utilized is full, as determined by block 134, then block 136 illustrates the switching to a second buffer in the switched bank memory system of data collection card 22. Next, the data contained within the filled buffer is output to memory within second processor 26, in the manner described above with respect to FIG. 4. Thereafter, block 140 illustrates a determination of whether or not additional data is being received and if so, the process returns to block 132 which depicts the storing of additional data within a buffer. In the event no additional data has been received, then the process terminates, as illustrated in block 142.

Upon reference to the foregoing, those ordinarily skilled in the art will appreciate that the Applicants in the present invention have created a software monitoring and development system which avoids the disadvantages of all known previous software monitoring and development techniques. By loading the software under development with a minimal number of uniquely identifiable elements or "hooks" and outputting a predetermined frame of data in association with each of these hooks, upon the encountering thereof, the processor overhead and output bus space required for known software based monitoring and development systems are not required.

Next, by rapidly transferring these frames of data to a second processor, the problems associated with known hardware based software monitoring and development techniques are avoided. The analysis and tagging of each data frame associated with a particular hook may then be accomplished "off-line" by the second processor without the prospect of processor speed differences between a first generation processor and a second generation processor causing great gaps in the data accumulated from the software application under development.

In this manner, the hybrid system disclosed herein permits the highly detailed trace of a software application during its development for long periods of time without unduly loading the processor being utilized or requiring a highly sophisticated high speed processor for hardware monitoring applications.

While the invention has been particularly shown and described with reference to a preferred embodiment, it will be understood by those skilled in the art that various changes in form and detail may be made therein without departing from the spirit and scope of the invention.

We claim:

1. A method for monitoring the performance of a selected software application with a first processor having an output bus, said method comprising the steps of:
   inserting a limited number of uniquely identifiable elements at selected locations within said selected software application;
   processing said selected software application within said first processor;
   automatically coupling to said output bus a unique identification of each of said limited number of uniquely identifiable elements, in association with a preselected data frame, in response to each encountering of one of said limited number of uniquely identifiable elements during processing of said selected software application;
   coupling a second processor having memory means coupled thereto to said output bus;
   associating a chronological order time value with said identification and said preselected data frame; and
   storing said identification, said preselected data frame, and said chronological order time value within said memory means coupled to said second processor wherein said performance of said selected software application may be monitored.

2. The method for monitoring the performance of a selected software application according to claim 1, further including the step of associating an identifying header frame with said identification, said selected data frame and said chronological order time value prior to storage thereof.

3. The method for monitoring the performance of a selected software application according to claim 1, further including the step of storing within said memory means coupled to said second processor an overrun indication in the even said identification and said preselected data frame are coupled to said output bus at a speed in excess of the speed at which said identification and said preselected data frame may be stored.

4. A data processing system for monitoring the performance of a selected software application within a first processor having an output bus, said data processing system comprising:
   means for inserting a limited number of uniquely identifiable elements at selected locations within said selected software application;
   means for automatically coupling to said output bus a unique identification of each of said limited number of uniquely identifiable elements in association with a preselected data frame, in response to each encountering of one of said limited number of uniquely identifiable elements during processing of said selected software application within said first processor;
   a second processor coupled to said output bus of said first processor, said second processor having memory means coupled thereto;
   means for associating a chronological order time value with said identification and said preselected data frame; and
   means for coupling said identification, said preselected data frame and said chronological order time value to said second processor for storage within said memory means coupled thereto.

5. A data processing system for monitoring the performance of a selected software application within a first processor having an output bus according to claim 4, further including means for storing an overrun indication within said memory means coupled to said second processor in the event said identification and said preselected data frame are coupled to said memory means at a speed in excess of the speed at which said identification and said preselected data frame may be stored.

6. A data processing system for monitoring the performance of a selected software application within a first processor having an output bus according to claim 4, wherein said memory means coupled to said second processor includes a switched bank memory device.

7. A data processing system for monitoring the performance of a selected software application with a first processor having an output bus according to claim 6, further including disk storage means coupled to said second processor.

8. A data processing system for monitoring the performance of a selected software application within a first processor having an output bus according to claim 4, wherein said means four coupling said identification and said preselected data frame to said second processor comprises a data output card coupled to said output bus of said first processor.

9. A data processing system for monitoring the performance of a selected software application within a first processor having an output bus according to claim 8, wherein said means for coupling said identification and said preselected data frame to said second processor comprises a data collection card coupled to said data output card by means of a dedicated cable.

10. A data processing system for monitoring the performance of a selected software application within a first processor having an output bus according to claim 8, wherein said second processor includes an input/output bus and wherein said data collection card is coupled to said input/output bus.

* * * * *